United States Patent [19]

Roeske

[11] Patent Number: 5,458,153
[45] Date of Patent: Oct. 17, 1995

[54] ROTARY VALVE FOR HYDRAULIC POWER STEERING WITH REDUCED NOISE AND LINEAR BOOST CHARACTERISTIC

[75] Inventor: Klaus J. Roeske, Lugarno, Australia

[73] Assignee: A. E. Bishop & Associates Pty. Limited, North Ryde, Australia

[21] Appl. No.: 256,350

[22] PCT Filed: Jan. 15, 1993

[86] PCT No.: PCT/AU93/00015

§ 371 Date: Jul. 15, 1994

§ 102(e) Date: Jul. 15, 1994

[87] PCT Pub. No.: WO93/13971

PCT Pub. Date: Jul. 22, 1993

[30] Foreign Application Priority Data

Jan. 16, 1992 [AU] Australia ................. PL0446
Oct. 23, 1992 [AU] Australia ................. PL5468

[51] Int. Cl.⁶ .......................... F15B 13/04; B62D 5/083
[52] U.S. Cl. ..................... 137/625.24; 137/625.22; 91/375 A
[58] Field of Search ............ 137/625.24, 625.23, 137/625.22, 625.21; 91/375 R, 375 A

[56] References Cited

U.S. PATENT DOCUMENTS

| | | | |
|---|---|---|---|
| 4,452,274 | 6/1984 | Haga et al. | 137/625.22 |
| 4,460,016 | 7/1984 | Haga et al. | 137/625.24 |
| 4,471,808 | 9/1984 | Thomsen et al. | 137/625.23 X |
| 4,471,809 | 9/1984 | Thomsen et al. | 137/625.23 X |
| 4,540,024 | 9/1985 | Bacardit | 137/625.21 |
| 4,577,660 | 3/1986 | Haga et al. | 137/625.24 |
| 4,624,283 | 11/1986 | Futaba | 137/625.24 |
| 4,924,910 | 5/1990 | Tabata et al. | 137/625.23 |
| 5,133,384 | 7/1992 | Tabata et al. | 137/625.23 |
| 5,267,588 | 12/1993 | Bishop et al. | 137/625.24 X |

FOREIGN PATENT DOCUMENTS

54039/86   2/1986   Australia.
2-258473  10/1990   Japan.

*Primary Examiner*—John Rivell
*Attorney, Agent, or Firm*—Nikaido, Marmelstein, Murray & Oram

[57] ABSTRACT

A rotary valve having chamfers (26,39) at the groove edges (31) of its input shaft (10) which, in conjunction with axially extending troughs (44), form metering edge contours. The chamfers (26,39) and troughs (44) at the edges (31) of the grooves (18a,18b) interacting with sleeve slots (19) to reduce valve hiss and linearise the boost characteristic of the valve.

11 Claims, 11 Drawing Sheets

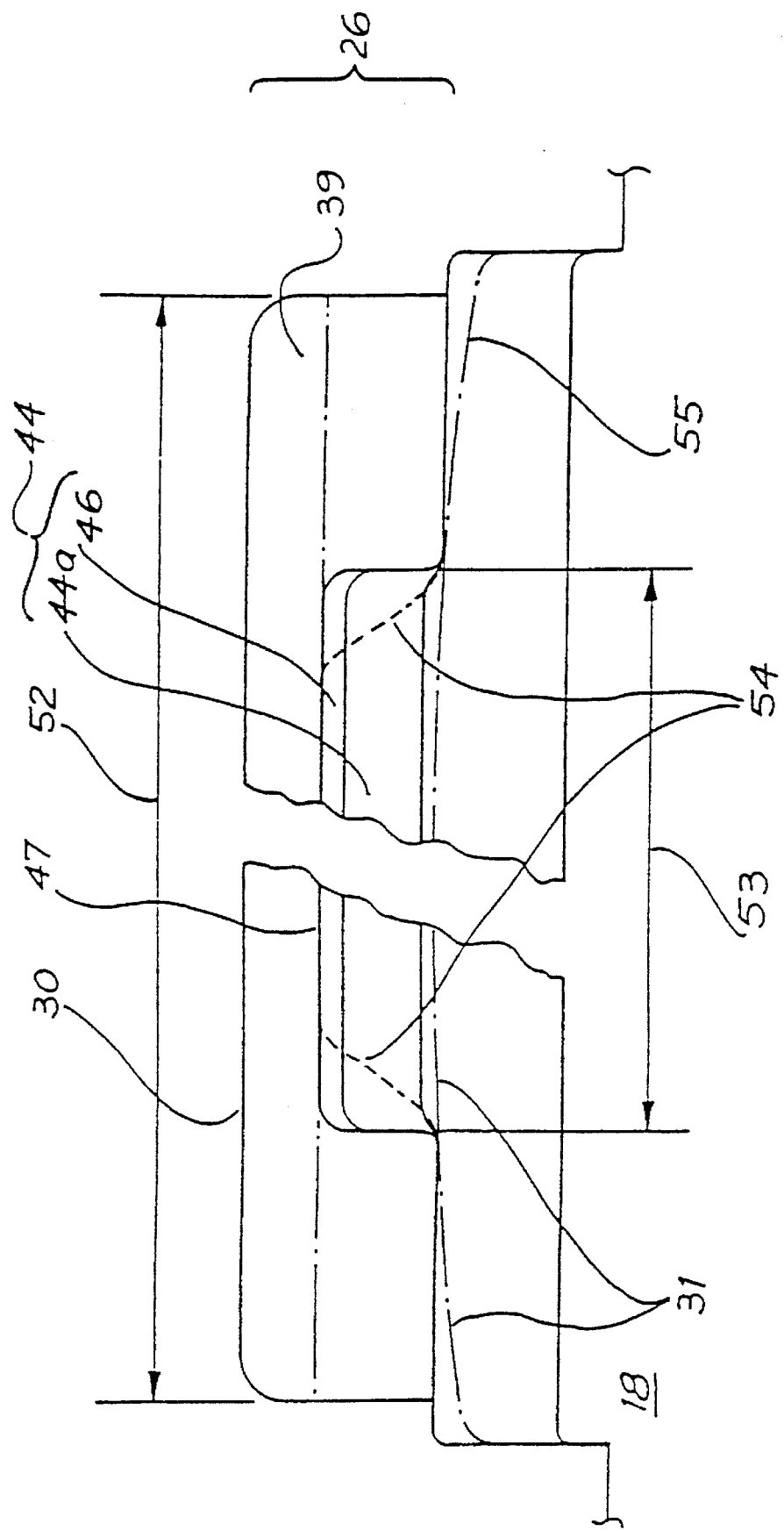

1

ROTARY VALVE FOR HYDRAULIC POWER STEERING WITH REDUCED NOISE AND LINEAR BOOST CHARACTERISTIC

TECHNICAL FIELD

This invention relates to rotary valves such as are used in hydraulic power steering gears for vehicles. More particularly the present invention provides low noise rotary valves with a substantially linear boost characteristic.

BACKGROUND ART

Such rotary valves include an input-shaft which incorporates in its outer periphery a plurality of blind-ended, axially extending grooves separated by lands. Journalled on the input-shaft is a sleeve having in its bore an array of axially extending blind-ended slots matching the grooves in the input-shaft, but in underlap relationship thereto, the slots of one being wider than the lands of the other so defining a set of axially extending orifices which open and close when relative rotation occurs between the input-shaft and the sleeve from a centred position. The magnitude of such rotation is hereinafter referred to as the valve operating angle. The edges of the input-shaft grooves are contoured so as to provide a specific orifice configuration and are referred to as metering edge contours. These orifices are ported as a network such that they form sets of hydraulic Wheatstone bridges which act in parallel to communicate oil between the grooves in the input-shaft and the slots in the sleeve, and hence between an engine driven oil pump, and right-hand and left-hand hydraulic assist cylinder chambers incorporated in the steering gear.

Typically, the input-shaft and sleeve are biased towards the centred position by a torsion bar spring. Thus when small input torques are applied to the steering wheel and hence the input-shaft, only a small magnitude of relative rotation occurs between the input-shaft and sleeve and, for such low valve operating angles, little power assistance is provided by the valve. For larger input torques proportionately greater valve operating angles are generated, leading to much greater levels of power assistance. The relationship between the level of power assistance generated in the valve, as a function of input torque, is known as the valve boost characteristic, and is largely determined by the metering edge contours.

It is convenient to refer to these metering edge contours as controlling three zones of the boost characteristic, the high pressure contour associated with the parking zone, an intermediate contour associated with the cornering zone, and a central zone associated with straight ahead driving where normally minimum boost is desired. For many vehicles it is becoming increasingly accepted that in the critical cornering zone, a truly linear relationship should exist between input torque applied by the driver and the level of power assistance, that is, a linear boost characteristic.

Rotary valves are nowadays regularly incorporated in firewall-mounted rack and pinion steering gears, and in this situation, any noises such as hiss emanating from the valve are very apparent to the driver. Hiss results from cavitation of the hydraulic oil as it flows in the orifices defined by the metering edge contours and the adjacent edges of the sleeve slots, particularly during times of high pressure operation of the valve such as during parking, where pressures typically as high as 8 MPa can be generated. It is well known in the art of power steering valves that an orifice is less prone to cavitation if the metering edge contour has a high aspect ratio of width to depth, thereby constraining the oil to flow as a thin sheet of constant depth all along any one metering edge contour and if, furthermore, the flow of oil is evenly divided amongst several metering edges ported to act in parallel, so further effectively reducing the flow of oil that may flow through any one orifice. It is also well known that cavitation is less likely to occur if the metering edge contour, where it intersects the outside diameter of the input-shaft, is nearly tangential thereto, hence constituting a shallow chamfer typically inclined at an angle of between 5° to 8°. This high pressure contour is operative at large valve operating angles and subtends an angle of about one degree at the input-shaft axis and thereafter extends towards the input-shaft groove edge as an intermediate contour in the form of a steeper chamfer or, preferably, in the form of a curved chamfer or scroll of decreasing radius. Such a latter scroll concept is earlier taught in EP Patent 0196172 and provides a means of achieving a linear boost relationship in the cornering zone. In some cases this scroll may be approximated by a series of flat chamfers of increasing steepness as taught in U.S. Pat. No. 4,460,016 (Haga).

Several manufacturers achieve the desired accuracy in the chamfer by grinding the input-shaft in special chamfer grinding machines wherein the shaft is supported on centres and rotated continuously while being cyclically moved towards and away from a large diameter grinding wheel of a width equal to the axial length of the chamfer under the action of a master cam. Because a large diameter grinding wheel is used, it is impossible to grind that part of the metering edge contour towards the centreline of the groove where increasing depth would cause the grinding wheel to interfere with the opposing edge of the same groove. The steeply sloping and relatively deep portion of the input-shaft metering edge contour principally determines the central zone of the boost characteristic. The appropriate contour here must however provide a smooth blend of orifice area with the adjoining cornering zone chamfer, thereby avoiding any discontinuity in the boost characteristic at the transition between these zones.

The correct metering edge contour in the central zone, including the transition, can be approximated by using milling or hobbing processes to form the input-shaft grooves. A better solution is available using the roll-imprinting process described in U.S. Pat. No. 4,651,551 (Bishop) which allows broad flexibility in featuring the three dimensional sides of the grooves.

A further problem occurs, however, in the transition between the cornering zone chamfer and the parking zone chamfer. Now, the flow of oil through the orifice of a power steering valve can generally be calculated using the Bernoulli flow equation for sharp edged orifices where, for a given flow rate, the pressure drop across an orifice varies as the inverse square of the orifice area, multiplied by an appropriate orifice coefficient "K". For an orifice of constant axial length and variable depth "d", as manufactured by the chamfer grinding process described earlier, pressure drop "P" is equal to $K/d^2$.

In the cornering zone where, after some threshold valve operating angle, a linear boost characteristic is desired, $P=f\alpha$ where "f" is a constant and "α" is the incremental valve operating angle in excess of this threshold. Therefore $f\alpha=K/d^2$, or d is proportional to $1/\sqrt{\alpha}$, and hence the cornering zone chamfer theoretically takes the form of a scroll whose depth with respect to the outside diameter of the input-shaft at any point on this chamfer varies as the inverse square root of rotation of that point from the aforesaid threshold valve operating angle.

In practice however, as "d" decreases towards 20 μm and assumes a sheet flow configuration, the viscous drag of the oil against the sides of the orifice becomes the dominant restriction to flow, and the linear boost relationship ceases.

For some steering applications, the resulting departure from linearity of the boost characteristic can be tolerated, but in others it is desirable to maintain linearity right up to the commencement of the parking zone. Such a characteristic is typical of another widely used type of power steering valve, namely, the hydraulic reaction valve which, however, is considerably more expensive to manufacture than torsion bar centred rotary valves such as described in this specification.

The essence of the present invention is the simulation of a hydraulic reaction valve style boost characteristic by incorporating additional orifice area in the cornering zone chamfer, so increasing the effective radial depth of the metering edge contour right up to the parking zone chamfer. The contour now comprises a trough whose bottom surface is substantially parallel to the outside diameter of the input-shaft. This trough-like contour terminates circumferentially in an abrupt axially extending escarpment leading to the parking zone chamfer on one side and on the other side blends to the cornering zone chamfer or opens to the adjoining input-shaft groove. The noise suppressing characteristic of the parking zone chamfer is therefore not compromised by the presence of the trough.

The pressure drop in the flow of oil across trough-like orifices is entirely different to that occurring in sharp-edged orifices. Thus a trough-like orifice whose length "L" in the direction of oil flow is many times its depth "d" has a pressure drop "P" proportional to $k/Ld^3$, where "k" is the kinematic viscosity of the oil. The flow restriction, as determined by this equation, varies as the inverse cube of the orifice depth rather than as the inverse square as for the sharp-edge orifice equation. As the flow restriction depends on its length "L" which, in the orifice configuration used here, is proportional to the valve operating angle, the trough arrangement contributes to providing the linear boost characteristic.

Trough-like metering edge forms occur in certain other prior art steering gear valve designs which are directed towards achieving low noise operation in the parking zone in addition to a linear boost characteristic in the cornering zone and a sharp transition therebetween. For example U.S. Pat. No. 4,924,910 (Tabata et al.), in one construction, shows the use of a metering edge contour comprising a notch running circumferentially the entire valve angular extent as well as the entire axial length of the metering edges. Various forms of notch are shown all having, over a portion of their angular extent, a pseudo-cylindrical configuration. Noise suppression is achieved by having the oil flow arranged to hug the adjoining input-shaft or sleeve surfaces, and the oil entry to the notch constructed so as to avoid turbulent flow. FIG. 11 of that patent shows this method of notching applied to the edges of the sleeve slots at the oil inlet ports, and presumably a similar notch configuration is applied to the edges of the input-shaft grooves at the oil return ports (not illustrated). The design poses great difficulty in manufacturing since notches of great depth precision are required on some edges of both the sleeve and the input-shaft. It is believed that less noise suppression is achievable by this construction than when the metering edge contour in the parking zone is ground as a chamfer as in the case of the present invention.

An alternate construction shown in U.S. Pat. No. 4,924,910 (Tabata et al.), consists of a system in which notched metering edges, formed either on some of the edges of the sleeve slots (FIG. 5 of that patent) or on some of the edges of the input-shaft grooves (FIG. 8 of that patent), are used to "cross-bleed" hydraulic oil between left-hand and right-hand cylinder ports. Abrupt closing-off of these notched metering edges produces the aforementioned sharp transition between the linear boost cornering zone and the parking zone. These notches are recognised as being generators of noise, however this noise is suppressed by removal of the normally adjacent return ports and using the flow through the remaining metering edges in the valve to raise the back pressure in the region of these notched metering edges. However the inclusion of these notched metering edges, and the removal of the adjacent return ports, reduces the normal four Wheatstone bridges in this style of valve to effectively only two. This correspondingly reduces the available aforementioned aspect ratio since half the metering edges in the valve are devoted to the "cross-bleed" function, and therefore has a detrimental effect on noise suppression and valve responsiveness.

Also the notches, if employed on the edges of the sleeve slots, are necessarily produced by a broaching method and therefore extend the full length of these edges. This eliminates the ability to shorten these notches such that they are shorter than the overall sleeve slots, this shortening permitting tailoring (or modifying) the sharpness of the aforementioned transition between the linear boost cornering zone and the parking zone.

DISCLOSURE OF THE INVENTION

The present invention therefore consists in a rotary valve for a hydraulic power steering gear comprising an input-shaft having in its outer periphery a plurality of axially extending grooves separated by lands, a sleeve journalled on said input-shaft, said sleeve having in its bore an array of axially extending slots matching the grooves in the input-shaft but in underlap relationship thereto, the slots of said sleeve being wider than the lands of said input-shaft so defining a set of axially extending orifices controlling fluid flow within said valve which open and close when relative rotation occurs between the input-shaft and the sleeve from a centred position, spring means urging said input-shaft and said sleeve towards said centred position, at least two edges of said grooves incorporating metering edge contours comprising a high pressure contour associated with parking an intermediate contour associated with cornering and a central contour associated with straight ahead steering, at least two said metering edge contours including shallow chamfers aligned parallel to the axis of said input-shaft and inclined inwardly from the outside diameter of said input-shaft towards respective grooves characterised in that said at least two chamfers incorporate axially extending troughs, each trough being at least partially within the intermediate contour and having a bottom surface and terminating circumferentially in one direction in an axially extending escarpment intersecting said chamfer and terminating circumferentially in the opposite direction at said groove or said chamfer.

In a first embodiment of the invention the trough is made axially shorter than the shallow chamfer, the remaining axial length of the chamfer extending circumferentially to the adjacent edge of the input-shaft groove. However it is preferred that this extension of the chamfer has a cross section which is in the form of a continuous scroll of increasing depth towards the edge of the groove. For certain applications it may be possible to substitute this continuous scroll with a second flat chamfer more steeply inwardly inclined than the abovementioned shallow chamfer. Alternatively a series of flat chamfers may be employed progressively more steeply inclined in the direction towards the input-shaft groove.

Such a trough has a small radius concave cross-section at the base of its escarpment and therefore cannot be produced by the chamfer grinding method described earlier. The trough in this first embodiment is not only axially shorter than the chamfer portion of the metering edge but also may be incorporated on only some (rather than all) of the metering edge contours. These factors allow relatively deep troughs to be used and hence the input-shafts to be manufactured using a roll-imprinting process.

However the use of such axially shorter troughs means that it is not possible to achieve a precisely uniform distribution of oil along the full length of all chamfers when the valve is operating in the parking zone, as oil reaches the start of each of these chamfers at a substantially higher pressure for axial positions where the trough is present than for other axial positions where no trough is present. This may cause increased levels of cavitation. Nevertheless for designs of valves where a low oil flow is used, this method still provides an efficient means of achieving acceptably low noise levels. For other designs requiring a relatively high oil flow and/or very low noise levels, it is preferred that the troughs extend along all metering edge contours most of their length, in which case they may be required to be as shallow as 20 µm to 30 µm. Also, because the roll imprinting process is carried out prior to input-shaft hardening and finish grinding of the outside diameter, such roll imprinted troughs are inevitably subject to random depth variations due to component distortion which could be tolerated if the troughs were relatively deep, but cannot be tolerated if they are only 20 µm to 30 µm deep. In such cases it is preferred that the troughs be produced, not by roll-imprinting, but by grinding after the input-shaft is hardened and finish ground on the outside diameter. A suitable trough grinding machine for this purpose is disclosed in copending Australian Provisional Patent Application PL5468 and incorporates a grinding spindle with an axis at right angles to the input-shaft axis and laterally displaced therefrom. The grinding wheel has a contoured periphery corresponding to the form of the trough and is fed radially to the required depth and then fed axially along the input-shaft during trough grinding. The resulting trough is therefore prismatic however with an oblique termination and the resulting rotary valve is in accord with a second embodiment of the present invention.

The term "oblique termination" as used in the present specification means an axial termination of a trough constituted by the convergence of first and second intersecting lines, said first intersecting line being generated by the intersection of said chamfer and the escarpment of said trough, and said second intersecting line being generated by the intersection of said bottom surface of said trough and said chamfer or the edge of said groove thereby effecting a gradual reduction in the circumferential width and radial depth of said trough in the region of said axial termination.

As mentioned earlier, the trough geometry, according to the first embodiment of the present invention, will inherently produce a non-uniform distribution of oil flow across the length of the chamfer. However, in the case of this second embodiment, the oblique termination of the trough causes a less sudden change in the flow velocity of the oil. This reduces viscosity-induced shear forces in the oil and hence reduces cavitation compared to the situation where such a termination is sharp. It can be shown that a grinding wheel of about 30 mm to 40 mm diameter will provide an oblique axial termination (or "run-out") of about 5° to 8° relative to the outside periphery of the input-shaft, an angle similar to that occurring circumferentially between the previously (or subsequently) produced chamfer and the outside diameter of the input-shaft and, as described earlier, used to prevent flow separation.

The trough according to the second embodiment of the present invention will have, on average, a greater depth than that of the chamfer, but be of substantially constant depth or increase in depth towards the escarpment portion of the trough, whereas the chamfer becomes progressively shallower. Also, because of the accuracy imparted by the trough grinding operation, the trough can be made to extend for a longer axial length than for the trough in the case of the first embodiment of the present invention, preferably approaching the full length of the metering edge contour. The flow of oil thus takes the form of a thin sheet over substantially the full length of the metering edge contour including the chamfer, the trough and its oblique termination.

Now, it is known that in such orifices which are wide but of relatively shallow depth, the flow of oil tends to be laminar, and that the resistance to flow is greatly influenced by the roughness of the surfaces which bound the orifices. The effect of such roughness is far greater when the direction of the surface finish irregularities, as those for example produced by a grinding wheel, lie at right angles to the direction of flow than when they lie in the same direction.

In the case of the chamfer metering edge contour made by the earlier described chamfer grinding machine the grinding surface finish is inherently directed in the same direction as flow, whereas inevitably in the trough according to the second embodiment of the present invention, the grinding surface finish is inherently directed at right angles thereto. This underlines the importance in controlling the surface finish of the ground trough whose geometry is according to this second embodiment; with particular regard to the wheel dressing technique employed to maintain the grinding wheel. Such techniques are disclosed as part of copending Australian Provisional Patent Application PL5468.

BRIEF DESCRIPTION OF THE DRAWINGS

In order that the invention may be better understood, various embodiments thereof are now described, by way of example, with reference to the accompanying drawings, in which:

FIG. 7 is a radial view of the metering edge contour shown in FIG. 4 in accordance with a first embodiment of the present invention;

BEST MODES

Figure 1:
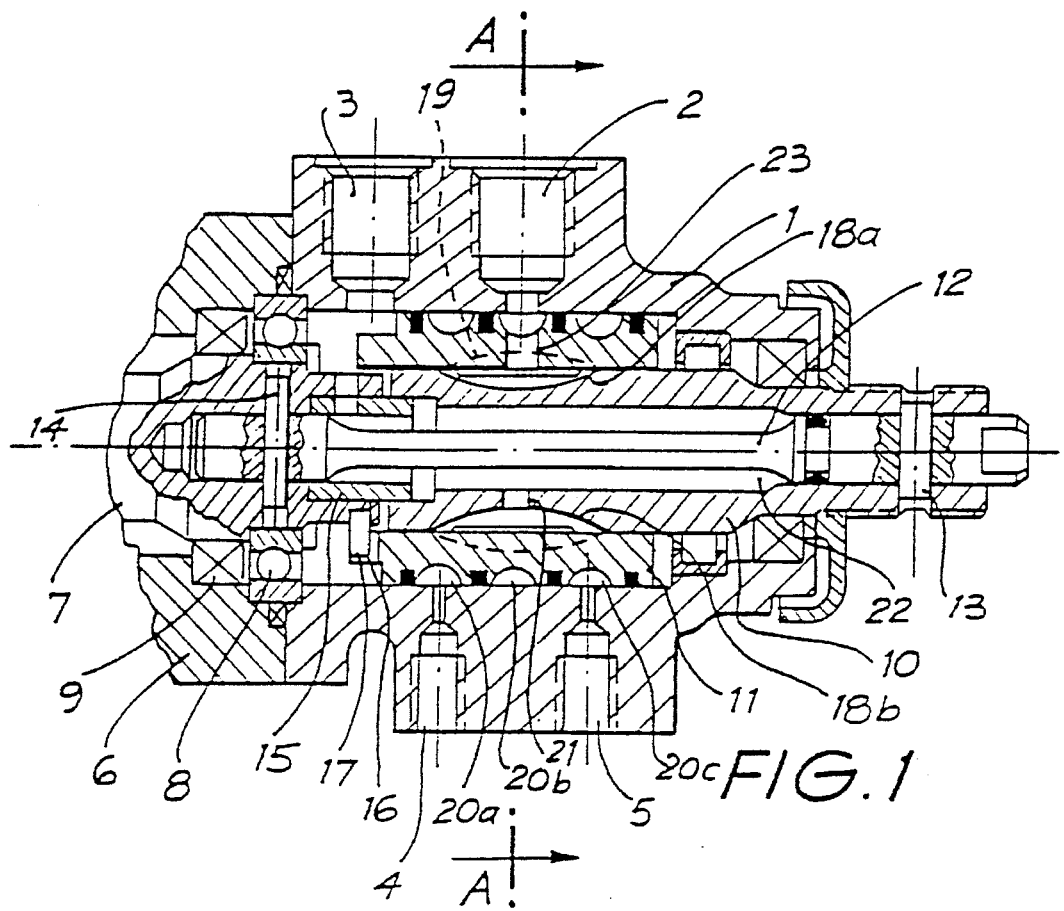
FIG. 1 is an axial cross-sectional view of a rotary valve installed in a valve housing of a power steering gear.

Referring to FIG. 1, valve housing 1 is provided with pump inlet and return connections 2 and 3 respectively and right and left hand cylinder connections 4 and 5. Steering gear housing 6, to which valve housing 1 is attached, contains the mechanical steering elements, for example, pinion 7, journalled by ball race 8 and provided with seal 9. The three main valve elements comprise input-shaft 10, sleeve 11 journalled thereon, and torsion bar 12. Torsion bar 12 is secured by pin 13 to input-shaft 10 at one end, similarly by pin 14 to pinion 7 at the other. It also provides a journal for input-shaft 10 by way of bush 15. Sleeve 11 has an annular extension having therein slot 16 engaging pin 17 extending radially from pinion 7.

Figure 2:
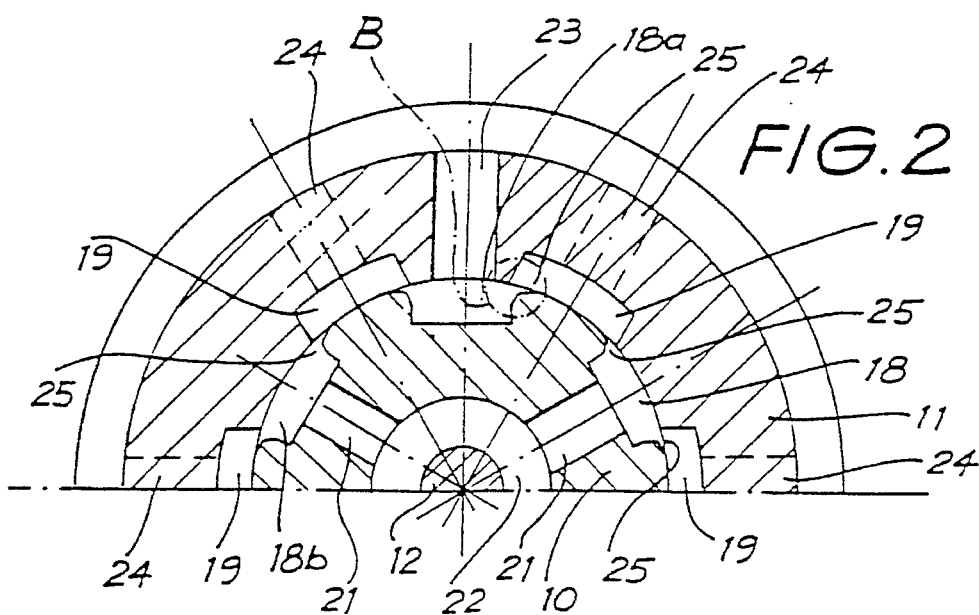
FIG. 2 is a transverse cross-sectional view on plane A—A in FIG. 1 of the input- shaft and surrounding sleeve components of the rotary valve.

Referring now also to FIG. 2, input-shaft 10 incorporates on its outside periphery six axially extending, blind-ended grooves 18a and 18b. These grooves are disposed in an underlap relationship to six corresponding axially extending, blind-ended slots 19 on the mating inside diameter of sleeve 11. Sleeve 11 is also provided on its outside periphery with a series of axially spaced circumferential grooves 20a, 20b, 20c separated by seals. Radial holes 21 in input-shaft 10 connect alternate grooves 18b to centre hole 22 in input-shaft 10 whence return oil can flow to pump return connection 3.

Radial holes 23 in sleeve 11 connect the remaining alternate grooves 18a of input-shaft 10 to the centre circumferential groove 20b, and so to inlet connection 2. Alternate sleeve slots 19 are connected by radial holes 24 to corresponding circumferential grooves 20a and 20c and so to cylinder connections 4 and 5.

In FIG. 2 it will be seen that, in the centred position of the valve illustrated, the underlapping of the six grooves 18a and 18b and six slots 19 form twelve axially extending orifices 25, whose area varies as a function of valve operating angle, that is as a function of the relative rotation of input-shaft 10 and sleeve 11 from their centred position. The resulting boost characteristic therefore depends on the geometry of metering edge contours formed on the edges of grooves 18a and 18b of input-shaft 10.

Figure 3:
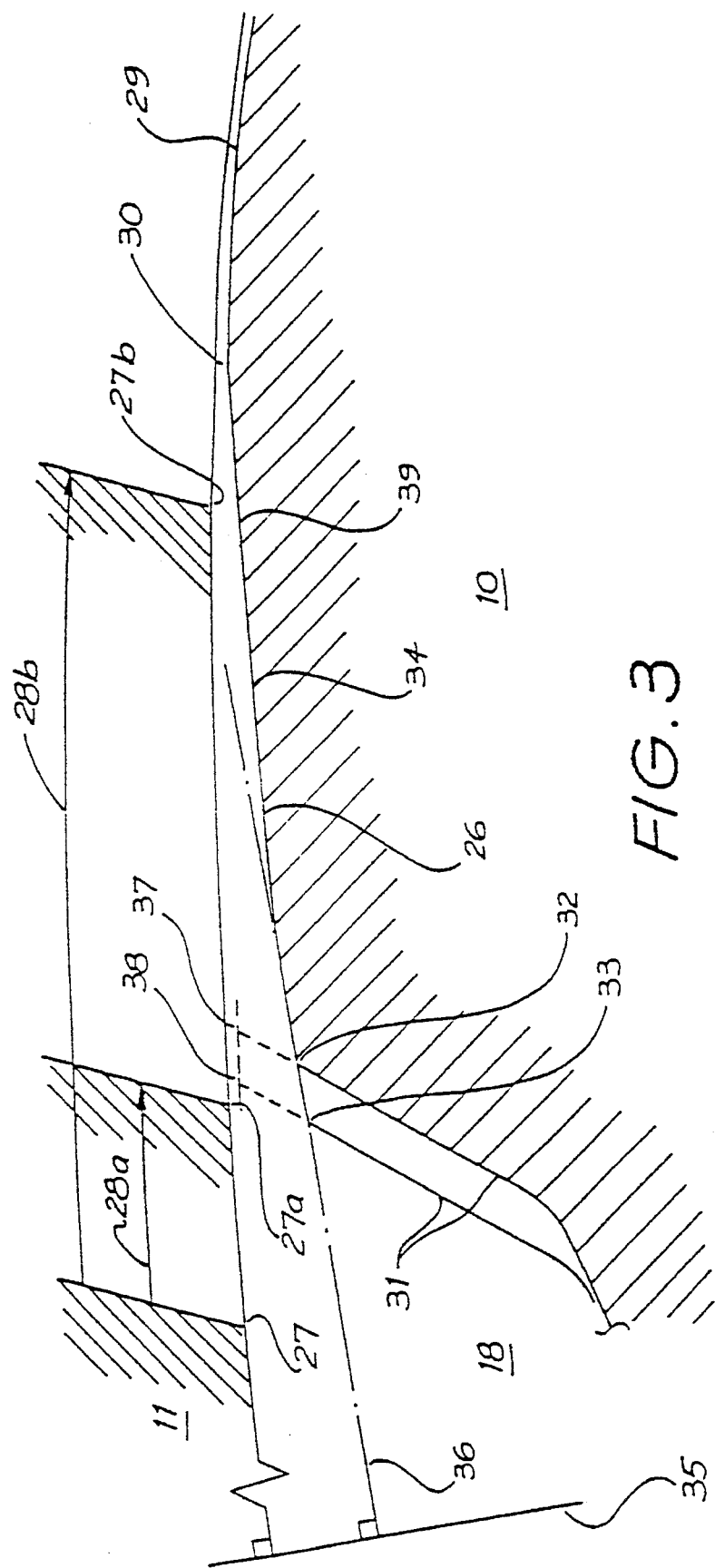
FIG. 3 is a greatly enlarged view of region B in FIG. 2 showing details of the orifice formed between the input-shaft metering edge contour and the adjacent sleeve slot edge in accordance with an embodiment of copending Australian Provisional Patent Application PK 3787.

FIG. 3 is a greatly enlarged view of region B in FIG. 2 in accordance with an embodiment of copending Australian Provisional Patent Application PK3787, showing that the metering edge contours each comprise chamfer 26 and groove edge 31. Thus orifices 25 are formed between these metering edge contours and the interacting adjacent edges 27 of slots 19 of sleeve 11. In this rotary valve all twelve chamfers 26, that is six on the sides of inlet grooves 18a and six on the sides of return port grooves 18b, are of identical geometry, with alternate chamfers a mirror image of that shown. Chamfer 26 is shown here in its orientation with respect to edge 27 when the valve is in the centre position. As relative rotation occurs between input-shaft 10 and sleeve 11, edge 27 moves successively to positions 27a and 27b, these rotations from the centred position corresponding to valve operating angles 28a and 28b respectively. Chamfer 26 extends from the junction with the outside diameter 29 of input-shaft 10 as at point 30, to where it junctions with the steeply inclined groove edge 31 as at points 32 and 33.

Chamfer 26 comprises, between points 30 and 34, an essentially flat chamfer 39 in order to suppress noises in the parking zone, after which it becomes increasingly convex as it approaches point 33. Here it has become perpendicular to centreline 35 of groove 18, and hence can no longer be further ground by a large diameter grinding wheel whose periphery, at the scale shown here, appears as near-straight line 36. Chamfer 26 has the aforementioned inverse square root geometry between points 34 and 33, assisting to provide the linear pressure characteristic required of such valves in the cornering zone of the boost characteristic.

Groove edge 31 is shown as two lines representing the curved nature of the sides of groove 18, which may be so formed by milling, hobbing or roll-imprinting methods well known in the art. Prior to grinding chamfer 26, groove edge 31 would have extended to intersect the cylindrical surface of the input-shaft outside diameter 29 along an axially extending curved line on this surface between points 37 and 38. Of course, in other possible embodiments, groove edge 31 could be straight, meaning that points 32 and 33 (and hence also points 37 and 38) would be superimposed.

It can be appreciated that the pressure rise developed by orifice 25 up to valve operating angle 28a where, at point 27a, sleeve slot edge 27 makes its closest approach to point 32, is controlled by the geometry of groove edge 31. On the other hand, the pressure rise developed by orifice 25 through the range of valve operating angles 28a–28b is controlled by the form of chamfer 26. At the point corresponding to sleeve edge position 27b, the distance between 27b and flat chamfer 39 is typically 0.012 mm and generates sufficient pressure for vehicle parking.

Figure 5:
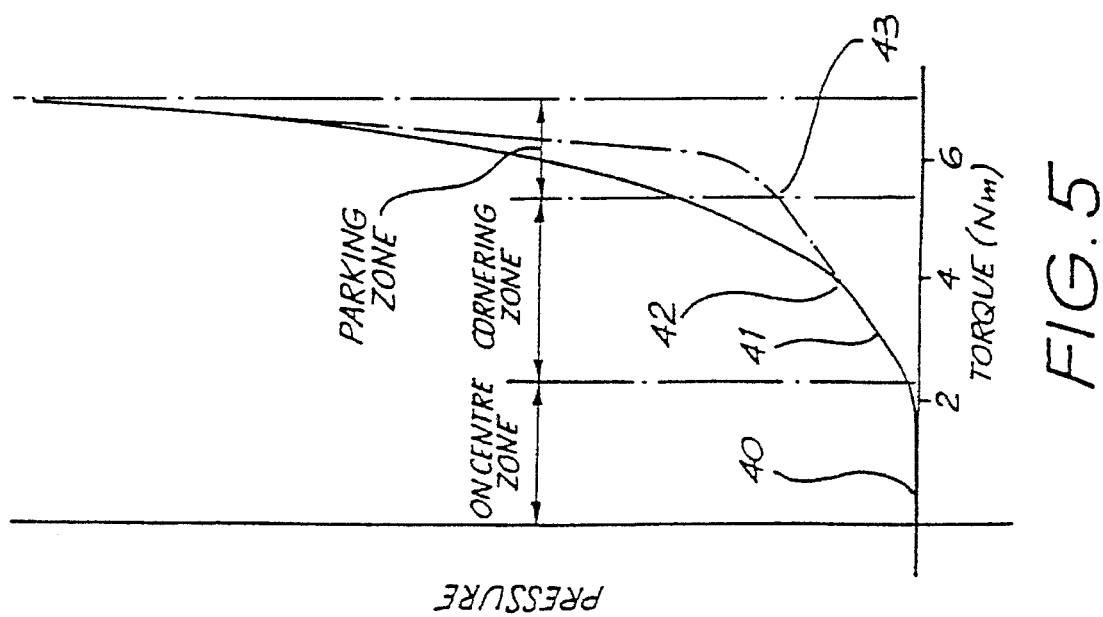
FIG. 5 is a plot of the valve boost characteristic for the metering edge contour of FIG. 3.

FIG. 3 shows groove edge 31 and chamfer 26 according to an embodiment of copending Australia Provisional Patent Application PK3787. The corresponding boost characteristic shown in FIG. 5 shows that there is, adjacent to central zone 40, a short linear boost region 41. Despite the scroll-like form of chamfer 26, the boost characteristic beyond linear boost region 41, that is beyond point 42, rises non-linearly in a parabolic fashion with no clear distinction between the cornering zone and the parking zone. For some vehicles it is desirable to have a boost characteristic as indicated by the dotted line showing a linear boost characteristic up to point 43 and thereafter a quick turn-around into the parking zone. The additional pressure rise beyond point 42 is due to the effect of viscous drag of the oil on the surfaces of the input-shaft and sleeve which becomes increasingly dominant as the depth of the orifice decreases.

Figure 4:
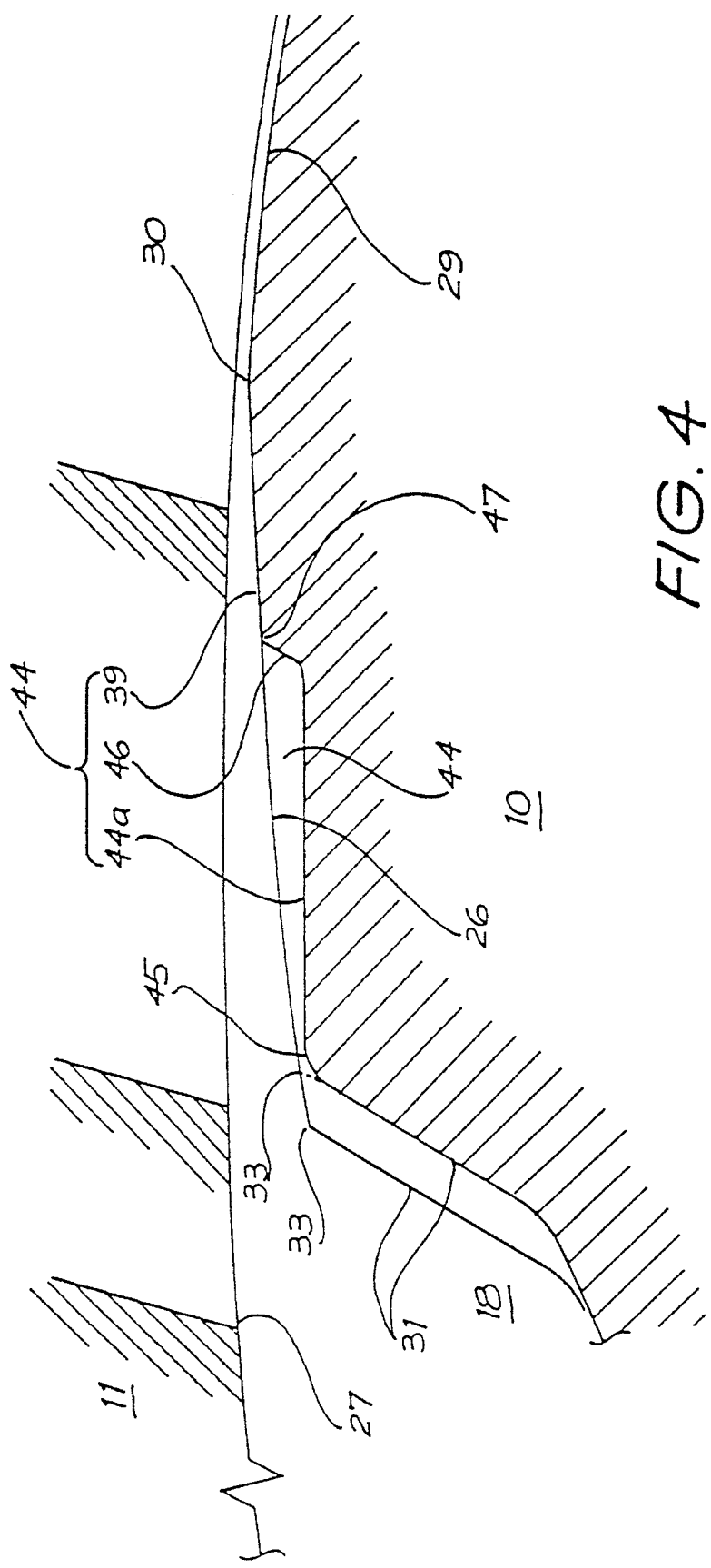
FIG. 4 is a magnified transverse section, similar to FIG. 3, but showing the chamfer incorporating a trough in accordance with a first embodiment of the present invention.

FIG. 4 shows a first embodiment of a metering edge contour according to the present invention, having groove edge 31 substantially of the same curved form as exemplified in FIG. 3. Chamfer 26 is also similar to that shown in FIG. 3 but is provided with an additional feature by way of a depression or trough 44 extending along part of the axial length of chamfer 26. Trough 44 has a bottom surface 44a disposed substantially parallel to input-shaft outside diameter 29. At the low pressure end, bottom surface 44a adjoins groove edge 31 at rounded profile 45, and at the higher pressure end, bottom surface 44a rises as an axially extending escarpment 46 to meet flat chamfer 39 of chamfer 26 at point 47.

Figure 6:
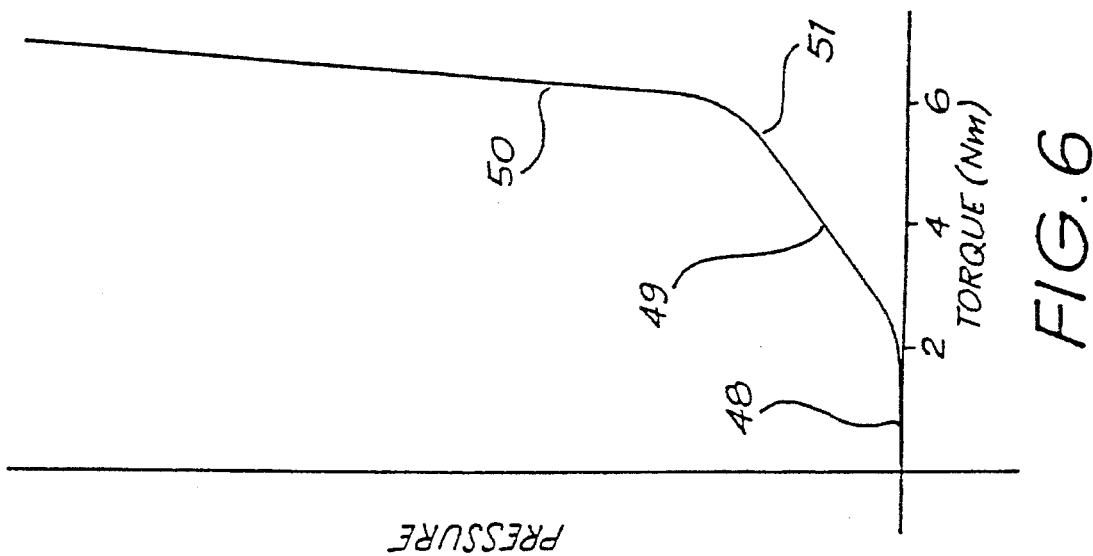
FIG. 6 is a plot of the valve boost characteristic for the metering edge contour of FIG. 4.

The corresponding boost characteristic, resulting from the metering edge contour geometry shown in FIG. 4, is shown in FIG. 6. Groove edge 31 produces the central zone 48 of the valve boost characteristic. Bottom surface 44a of trough 44, in combination with those other parts of chamfer 26 lying between points 33 and 47 produces the linear boost cornering zone 49 of the valve boost characteristic. Flat chamfer 39 of chamfer 26 produces parking zone 50 of the valve pressure characteristic. The sharp "turn around" of the valve boost characteristic between zones 49 and 50, as point 51, results from the high rate of reduction of orifice area as sleeve slot edge 27 traverses axially extending escarpment 46 of trough 44.

FIG. 7 shows a radial view of the metering edge shown in FIG. 4. It will be recalled that the sides of groove 18 have preferably been formed by milling or hobbing so as to produce an improved blending with chamfer 26 and may, in addition, have been roll imprinted with specific longitudinal contours, for example, as at 55. The same roll imprinting process may also be used to form trough 44 in the input-shaft prior to grinding of chamfer 26. As can be seen, flat chamfer 39 of chamfer 26 extends along the entire axial length 52 of the metering edge contour whereas trough 44 has a shorter axial length 53 and may be contoured as shown by dotted lines 54 when viewed in this radial direction. As explained earlier, the shorter axial length of trough 44 means that, for the same pressure characteristic, it is deeper. This, in turn, minimises the sensitivity of the pressure characteristic to manufacturing depth variations during the roll imprinting or coining of trough 44. However the axially long, relative shallow, high aspect ratio chamfered surface 39 assists in reducing valve noise during high pressure valve operation, associated with parking.

Figure 8:
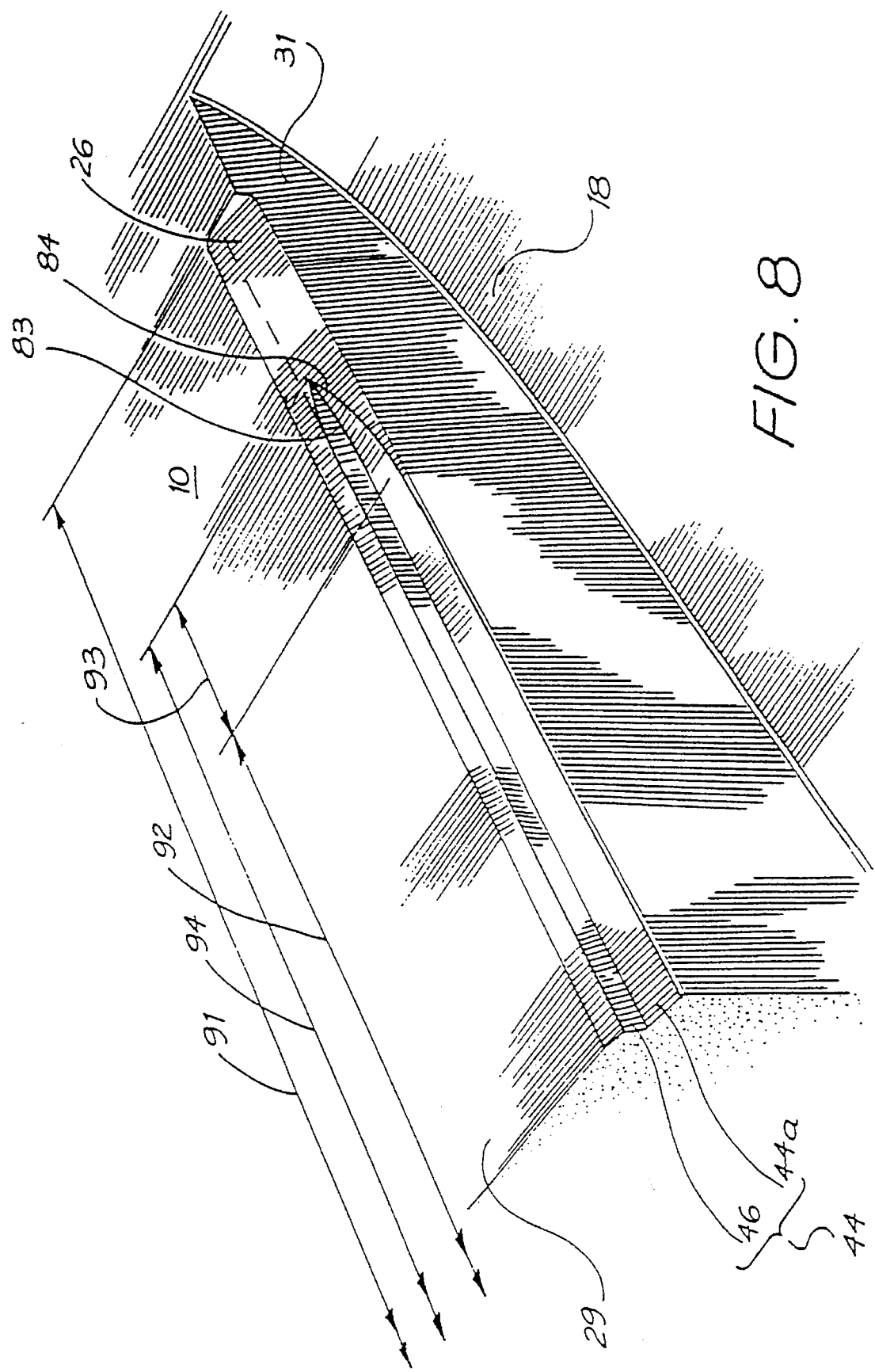
FIG. 8 is an isometric view of a metering edge contour incorporating a ground trough in accordance with a second embodiment of the present invention.
Figure 9:
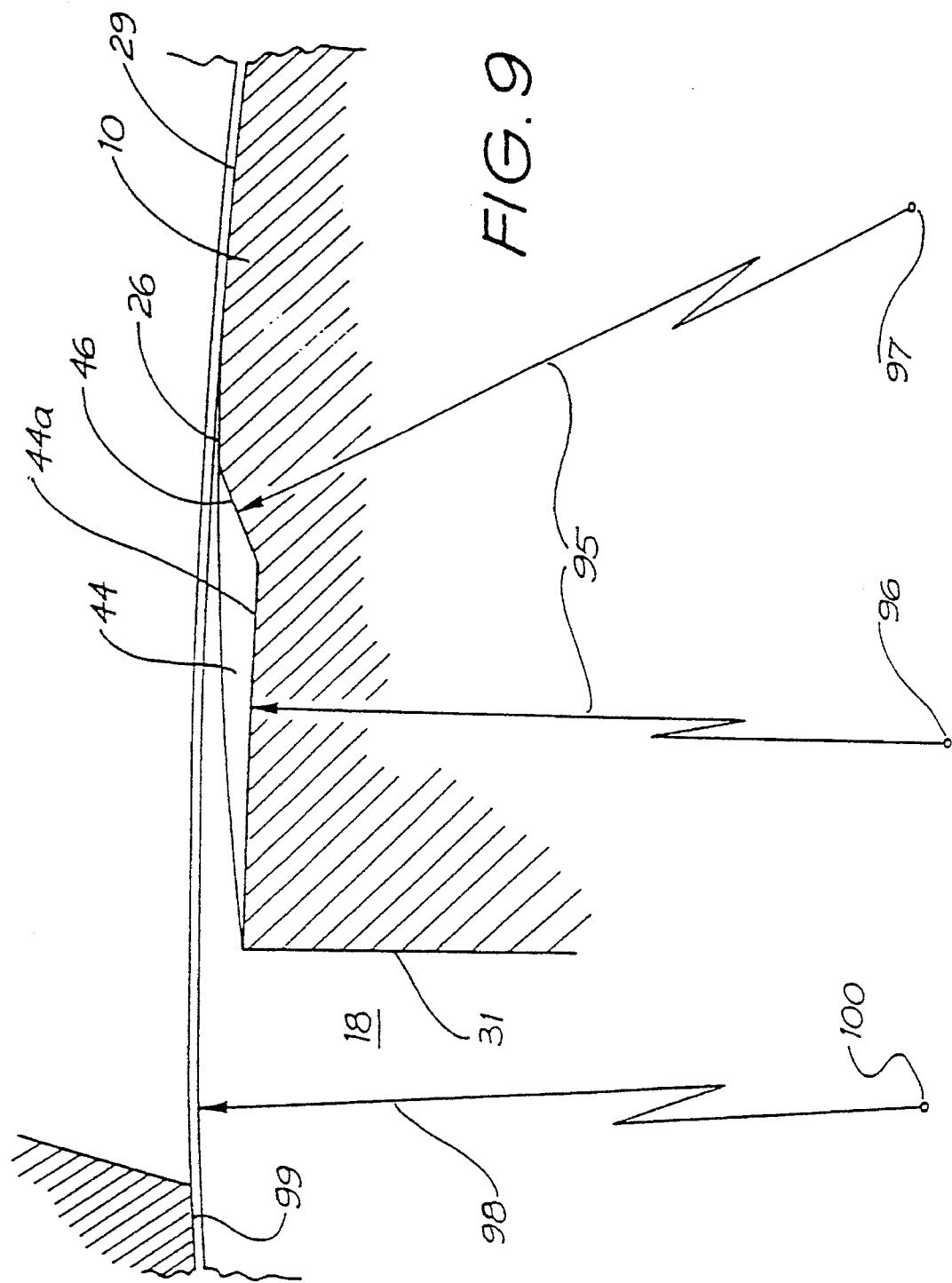
FIG. 9 is a cross sectional view through a preferred form of the metering edge contour shown in FIG. 8, on a plane perpendicular to the input-shaft axis.

FIGS. 8 and 9 show the general appearance of the input-shaft metering edge contour made in accordance to a second embodiment of the present invention. Here input-shaft groove 18 has been produced by milling or hobbing and may or may not have been modified by roll imprinting in order to improve the accuracy of spacing of groove edge 31.

Chamfer 26 is substantially the same as the chamfer of the first embodiment and preferably extends towards groove edge 31 in the form of a parabolic scroll. Trough 44 again comprises bottom surface 44a and escarpment 46. A particular feature of this construction relates to the blending longitudinally of trough 44 into chamfer 26. As is best seen in FIG. 8 the oblique termination of trough 44 is achieved by the convergence of two intersecting lines, namely upper line 83 and lower line 84, upper line 83 being generated by the intersection of escarpment 46 with chamfer 26 and lower line 84 being generated by the intersection of bottom surface 44a with chamfer 26. Such an oblique termination of trough 44, as described earlier, reduces shear forces in the oil that would normally occur in the case of a sharp termination of the trough, thus reducing the possibility of forming vortices as the oil discharges into the adjoining valve chambers. This is particularly the case for those metering edge contours which are subject to outward flow from the input-shaft groove into the adjacent sleeve grooves.

As described earlier, and as more fully detailed in copending Australian Provisional Patent Application PL5468, trough 44 is generated by a trough grinding wheel with its rotational axis disposed perpendicular to the axis of input-shaft 10. In FIG. 8 the axial length of chamfer 26 produced by the chamfer grinding wheel is illustrated as length 91 and the distance of axial traverse of the trough grinding wheel is illustrated as length 92, these lengths typically being 15 mm and 10 mm respectively. Now, by way of example, a satisfactory oblique termination of a 30 μm deep trough 44 can be achieved using a trough grinding wheel diameter of 30–40 mm. This produces a "wash-out" length 93 of the trough grinding cut in chamfer 26, and hence an oblique termination of trough 44, of approximately 1 mm at each end. Hence the overall length 94 of trough 44 will be 12 mm and, because of the presence of the oblique termination produced by the trough grinding operation, will have the additional advantages of noise suppression previously described. Also note that, because of the shallower depth of trough 44, escarpment 46 is more shallowly inclined to cylindrical surface 29 of the input-shaft than in the case of the first embodiment.

In a preferred form of this second embodiment of the present invention shown in FIG. 9, for reasons relating to the ease of production and improved symmetry of the metering edge contours on opposing edges of the grooves, bottom surface 44a and escarpment 46 comprise arcs of equal radius 95 about centres 96 and 97. This radius is not necessarily the same as radius 98 of cylindrical periphery 29 of the input-shaft whose central axis is shown at centre 100. The convexity of escarpment surface 46 permits tailoring (or modifying) of the sharpness of the aforementioned transition between the linear boost cornering zone and the parking zone. For some applications this transition in the boost characteristic should be as sharp as possible; for other applications this transition can be more gentle.

Centres 96 and 100 may be coincident in which case bottom surface 44a of trough 44 is of uniform radial depth with respect to bore 99 of the mating sleeve, which is illustrated here for reference. Alternatively centre 96 may be displaced to the left of centre 100 (as shown), and/or above centre 100, so that trough 44 increases in depth towards escarpment 46.

FIGS. 10 through 14 show several of many variations of metering edge contours which can be used to achieve the principle objectives of the invention.

Figure 10:
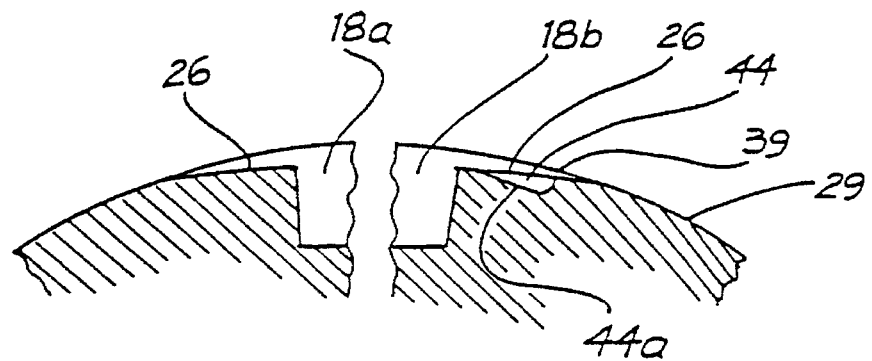
FIGS. 10–14 show other possible embodiments of input-shaft metering edge contours according to the present invention.
Figure 11:
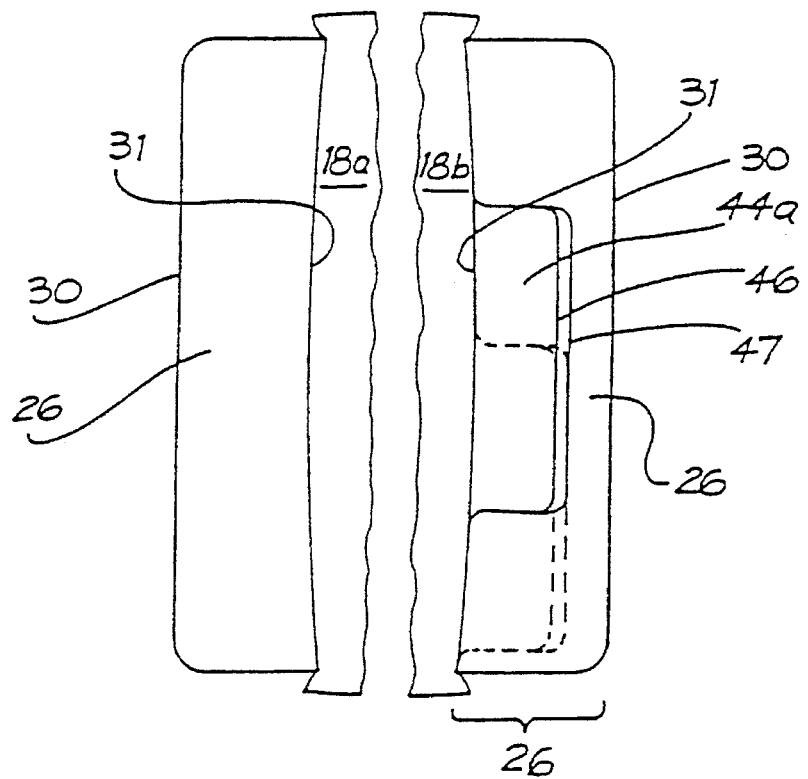

FIGS. 10 and 11, for example, show that trough 44 may be incorporated only in the edges of return grooves 18b, and not in the edges of inlet grooves 18a, or vice versa (refer to FIG. 2). Trough 44 will however usually be incorporated in at least two circumferentially adjacent metering edge contours in order to retain symmetry in the valve boost characteristic between left-hand and right-hand turns.

Chamfer 26 may also be either of the same form or different forms on the edges of the inlet and return ports. Trough 44 may be placed symmetrically along the axis with respect to chamfer 26 or axially displaced therefrom as shown dotted in FIG. 11.

Figure 12:
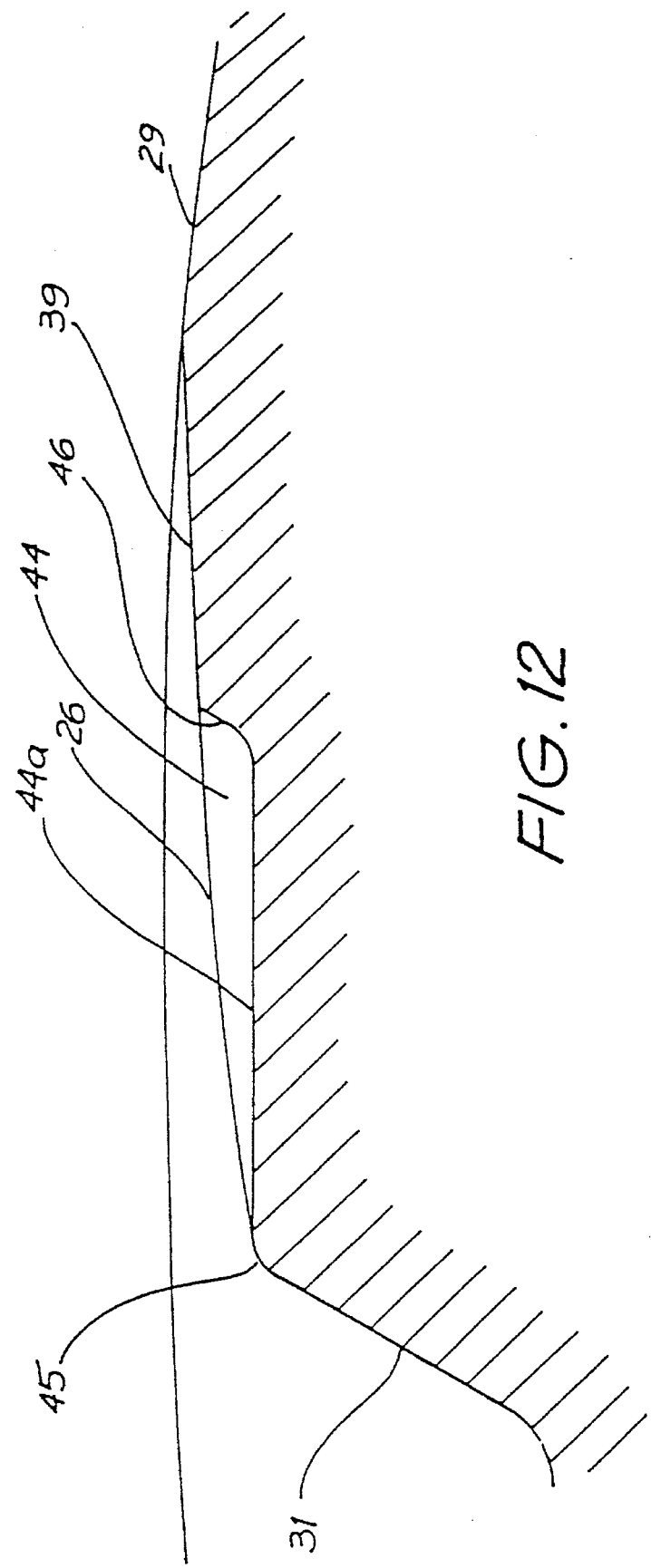

FIG. 12 shows where groove edge 31 and trough 44, including axially extending escarpment 46, have all been formed by the roll imprinting process referred to in reference to the first embodiment prior to grinding the remainder of chamfer 26, as indicated by rounded profile 45 at the junction of surfaces 44a and 31.

Figure 13:
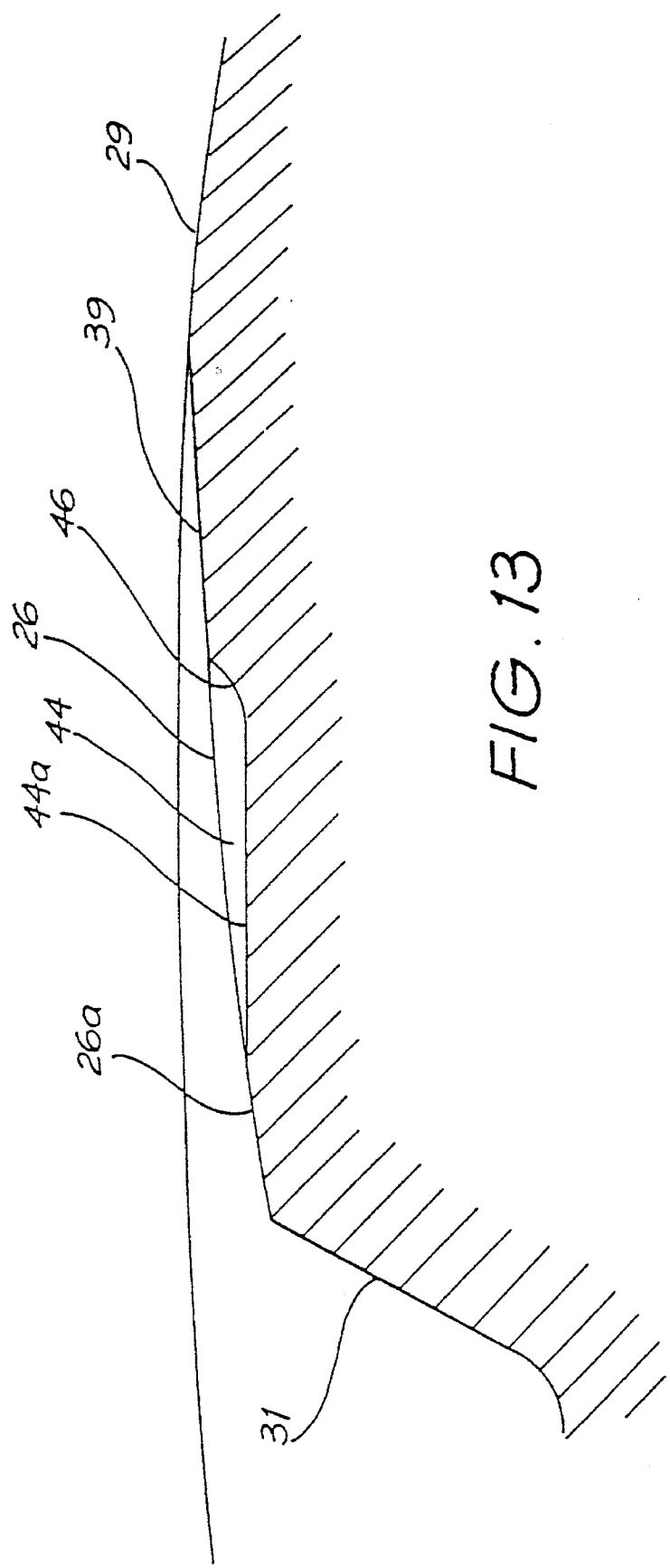

FIG. 13 shows where trough 44 stops circumferentially short of groove edge 31, and a portion of chamfer 26 remains as a strip 26a adjacent to groove edge 31. This arrangement is preferred where the orifice coefficient correction of chamfer 26, by way of the addition of trough 44, is only required over part of its circumferential length. Axially extending escarpment 46 may be gently inclined as shown here in order to modify the "turn around" of the boost curve as at point 51 in FIG. 6.

Figure 14:
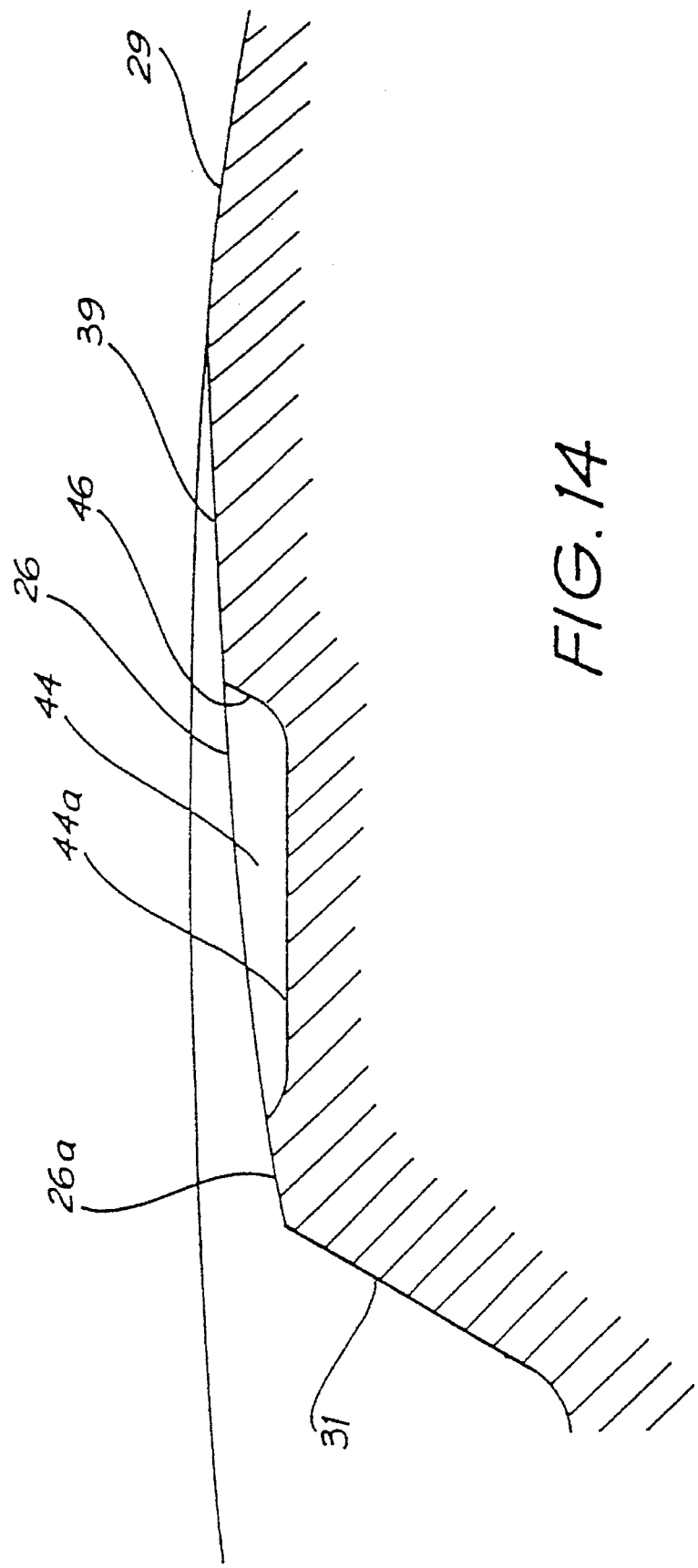

FIG. 14 shows an arrangement where trough 44 stops short as in the case of FIG. 13, but is also recessed in order to still further reduce the viscous effect due to the shallow nature of an orifice such as shown in FIG. 13. As strip 26a is ground as part of chamfer 26, there is less demand for accurate depth in the forming of trough 44.

It will be apparent to people skilled in the art of power assisted steering gears that numerous possible configurations of metering edge contour are feasible in accordance with the present invention.

I claim:

1. A rotary valve for a hydraulic power steering gear comprising an input-shaft having in its outer periphery a plurality of axially extending grooves separated by lands, a sleeve journalled on said input-shaft, said sleeve having in its bore an array of axially extending slots matching the grooves in the input-shaft but in underlap relationship thereto, the slots of said sleeve being wider than the lands of said input-shaft so defining a set of axially extending orifices controlling fluid flow within said valve which open and close when relative rotation occurs between the input-shaft and the sleeve from a centred position, spring means urging said input-shaft and said sleeve towards said centred position, at least two edges of said grooves incorporating metering edge contours comprising a high pressure contour associated with parking an intermediate contour associated with cornering and a central contour associated with straight ahead steering, at least two said metering edge contours including shallow chamfers aligned parallel to the axis of said input-shaft and inclined inwardly from the outside diameter of said input-shaft towards respective grooves characterised in that said at least two chamfers incorporate axially extending troughs, each trough being at least partially within the intermediate contour and having a bottom surface and terminating circumferentially in one direction in an axially extending escarpment intersecting said chamfer and terminating circumferentially in the opposite direction at said groove or said chamfer.

2. A rotary valve as claimed in claim 1 wherein said bottom surface is substantially parallel and concentric to said outside diameter.

3. A rotary valve as claimed in claim 1 wherein said bottom surface is arcuate.

4. A rotary valve as claimed in claim 1 wherein the depth of said trough increases towards said escarpment.

5. A rotary valve as claimed in claim 1 wherein said bottom surface is recessed and inclined with respect to said chamfer in the region of said circumferential termination in said opposite direction.

6. A rotary valve as claimed in claim 1 wherein said trough is axially shorter than said shallow chamfer.

7. A rotary valve as claimed in claim 1 wherein said trough extends substantially the same axial length as said shallow chamfer.

8. A rotary valve as claimed in claim 1 wherein each said chamfer incorporates said troughs.

9. A rotary valve as claimed in claim 1 wherein said trough terminates axially at each end in an oblique termination, said oblique termination being constituted by the convergence of first and second intersecting lines, said first intersecting line being generated by the intersection of said chamfer and the escarpment of said trough, and said second intersecting line being generated by the intersection of said bottom surface of said trough and said chamfer or the edge of said groove thereby effecting a gradual reduction in the circumferential width and radial depth of said trough in the region of said axial termination.

10. A rotary valve as claimed in claim 1 wherein said trough is positioned axially symmetrically with respect to said chamfer.

11. A rotary valve as claimed in claim 1 wherein said axial centreline of said trough is axially displaced with respect to the axial centreline of said chamfer.

* * * * *